United States Patent

Burns et al.

[15] 3,639,294

[45] Feb. 1, 1972

[54] FLAME-RETARDANT, POLYURETHANE COATING COMPOSITIONS

[72] Inventors: Joseph P. Burns; Joseph Feltzin; Erich Kuehn, all of Wilmington, Del.

[73] Assignee: Atlas Chemical Industries, Inc., Wilmington, Del.

[22] Filed: Dec. 9, 1968

[21] Appl. No.: 782,409

[52] U.S. Cl. ............................252/182, 106/15 FP, 117/36, 260/2.5 AJ, 260/2.5 AR, 260/77.5 AR, 260/928, 260/DIG. 24

[51] Int. Cl. ..........................................................C09d 5/18

[58] Field of Search...............252/182; 260/2.5 AR, 2.5 AM, 260/2.5 AJ, 928, 929, 613 D, 607, 591, 819, 77.5 AR, DIG. 24; 106/15 FP; 117/136

[56] References Cited

UNITED STATES PATENTS

| | | | |
|---|---|---|---|
| 3,309,427 | 3/1967 | Zech et al. | 260/929 |
| 3,322,698 | 5/1967 | Wiles et al. | 260/77.5 |
| 3,407,150 | 10/1968 | Wismer et al. | 252/182 |

*Primary Examiner*—Richard D. Lovering
*Assistant Examiner*—Irwin Gluck
*Attorney*—Kenneth E. Mulford, Roger R. Horton and Ernest G. Almy

[57] ABSTRACT

Polyurethane coating compositions are provided which, after application to substrates, yield transparent coatings having superior flame retardancy and resiliency. The coating compositions comprise a solvent and a polyurethane reaction product of halogen-containing polyol, phosphorus-containing product, and organic polyisocyanate.

8 Claims, No Drawings

FLAME-RETARDANT, POLYURETHANE COATING COMPOSITIONS

This invention relates to coating compositions. More particularly, this invention relates to clear, flame-retardant, polyurethane coating compositions.

Polyurethane coating compositions are well known in the prior art. It is known that numerous insoluble inorganic compounds can be milled into conventional organic varnishes to produce paints which, after application to substrates, will prevent the spread of fire through the ultimate construction. However, there are many areas where clear coatings are preferred over paints. It is also known that the incorporation of halogens and phosphorous into polymeric organic compounds will improve the fire retardancy of the organo polymers, and this concept has been followed in the development of fire-retardant varnishes. Heretofore, however, the incorporation of the required concentrations of halogen and phosphorus has had a deleterious effect on polymer resilience. Clear, polyurethane coating compositions are needed in the coating arts and trades which exhibit the desired fire resistance without sacrifice of the necessary coating properties and without the requirement for addition of insoluble inorganic materials which tend to make the final coating dull and opaque.

It is an object of this invention to provide improved polyurethane coating compositions. It is another object of this invention to provide liquid, polyurethane coating compositions which, after application to substrates, yield transparent coatings having superior flame retardancy and resiliency. It is another object of this invention to provide moisture-curing polyurethane coating compositions. It is another object of this invention to provide polyurethane coatings which are clear, resilient, and flame retardant. It is another object of this invention to provide a blend of polyols. Other objects of this invention will become apparent hereinafter.

The polyurethane coating compositions of this invention comprise an organic solvent solution of a polyurethane reaction product of 1. an organic polyisocyanate,
2. a halogen-containing polyol characterized by the generalized formula

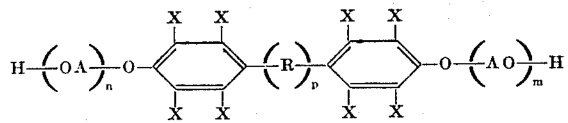

wherein each $X$ represents hydrogen or halogen and at least one $X$ is halogen, $R$ represents an alkylene group containing from one to four carbon atoms,

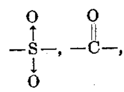

$-CH_2O\ CH_2$, or —O—, each $A$ represents an alkylene group containing from two to four carbon atoms, $p$ is 0 or 1, $n$ and $m$ are integers, and the sum of $n$ and $m$ is from 2 to 10, and 3. a phosphorus-containing product selected from the group consisting of
   a. a polyhydroxy phosphate ester product obtained by sequentially reacting polyphosphoric acid and alkylene oxide with an alcohol characterized by the formula

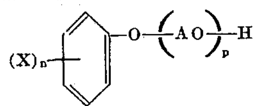

or by the formula

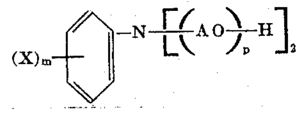

wherein $X$ represents a halogen atom, $n$ is an integer from 1 to 5, $m$ is an integer from 1 to 5, $A$ represents an alkylene group containing from two to four carbon atoms, and $p$ is from 1 to 5, provided that the alkylene oxide is used in the final reaction, b. a product obtained by reacting an alkylene oxide with a mixture of phosphoric acid and an alcohol characterized by the formula

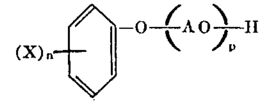

or by the formula

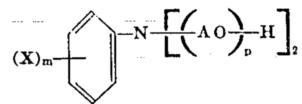

wherein $X$ represents a halogen atom, $n$ is an integer from 1 to 5, $m$ is an integer from 1 to 5, $A$ represents an alkylene group containing from two to four atoms, and $p$ is from 1 to 5, and c. a mixture containing from 90 to 10 percent by weight, preferably from 75 to 25 percent by weight, of at least one product selected from the group consisting of product (a) and product (b) defined above and from 10 to 90 percent by weight, preferably from 25 to 75 percent by weight of a polyhydroxy phosphate ester product (d) obtained by sequentially reacting polyphosphoric acid and alkylene oxide with a polyhydric alcohol, provided that alkylene oxide is used in the final reaction.

Throughout this specification and in the appended claims the term "a polyphosphoric acid" is meant to include phosphoric acid anhydride ($P_2O_5$) and hydrates thereof containing two or more phosphorus atoms per mol. It is preferred to employ the anhydride itself or a polyphosphoric acid containing at least 80 percent of the anhydride. Particularly preferred is a polyphosphoric acid containing from 82 to 84 percent $P_2O_5$.

The halogen-containing polyols (2) defined by the formula given above are known compounds, and they may be prepared in any suitable manner conventional in the prior art. For example, the halogen-containing polyols may be prepared by reacting 1 mol of a halogenated polyol having the formula

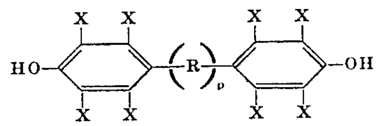

wherein $X$, $R$, and $p$ have the signification given above, with from 2 to 10 mols of alkylene oxide. Illustrative examples of alkylene oxides which may be used are ethylene oxide, propylene oxide, and butylene oxide. The preferred alkylene oxide is propylene oxide. The following are typical examples of the halogen-containing polyols (2) defined by the formula above: polyoxypropylene (2.4) 2,2-bis(4-hydroxy-dibromophenyl) propane; polyoxypropylene(2.4) 2,2-bis(2,3,5,6-tetrabromo-4-hydroxyphenyl) propane; polyoxypropylene(2) 2,2bis(2,3,5,6-tetrabromo-4-hydroxyphenyl) propane; polyoxypropylene(2) 2,2-bis(2,3,5,6-tetraiodo-4-hydroxylphenyl) propane; polyoxyethylene(8) 2,2-bis(2,3-dichloro-4-hydroxyphenyl) propane; polyoxybutylene(2.1) 2,2-bis(2,3-dichloro-5,6-dibromo-4-hydroxylphenyl) propane; polyoxyethylene(2) 2,2-bis(2-chloro-4-hydroxyphenyl) propane; polyoxypropylene(4)bis(4-hydroxy-dibromobenzyl) ether; polyoxypropylene(2.1)bis(4-hydroxy-dibromophenyl) ketone; polyoxypropylene(10) bis(4-hydroxy-dibromophenyl) sulfone; polyoxypropylene (2) bis(4-hydroxy-dibromophenyl) ether; polyoxypropylene(5) 1,1'-dihydroxybiphenyl; polyoxypropylene(2.1) bis(4-hydroxy-dibromophenyl) methylene; polyoxyethylene(2.2) 2,2-bis(4-hydroxy-dibromophenyl) propane.

A preferred class of halogen-containing polyols (2) useful in this invention are those polyols characterized by the generalized formula:

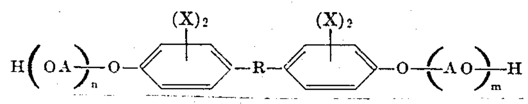

wherein $X$ is bromine or chlorine, and preferably bromine; $A$ is ethylene or propylene, and preferably propylene; $R$ represents an alkylene group containing from two to four carbon atoms, and preferably $-C(CH_3)_2-$; $n$ and $m$ are integers; and the sum of $n$ and $m$ is from 2 to 8, and preferably from 2 to 6.

In the preparation of the polyhydroxy phosphate ester products (a), the alcohol and polyphosphoric acid are first reacted together at moderate temperatures to form an acidic partial ester, and this acidic partial ester is then reacted with alkylene oxide to form an essentially neutral polyhydroxy phosphate ester product. The resulting polyhydroxy phosphate ester product may be sequentially reacted with additional polyphosphoric acid and alkylene oxide, provided that alkylene oxide is used in the final reaction.

The alcohols which are employed in the preparation of the polyhydroxy phosphate ester products (a) of this invention may be prepared by reacting alkylene oxide with a halogenated phenol or a halogenated aniline under etherification condition well known in the art. Illustrative examples of such alcohols include polyoxypropylene(2)dichloroaniline, polyoxyethylene(2)dichloraniline, polyoxypropylene(2) pentachlorophenol, polyoxypropylene(1)pentachlorophenol, polyoxypropylene(5)pentachlorophenol, polyoxypropylene(10)dichloroaniline, polyoxypropylene(2)mo nochlorophenol, polyoxybutylene(2)pentachlorophenol, polyoxypropylene(2)pentachloroaniline, polyoxybutylene(4)tetrabromophenol, polyoxypropylene(2.2)d ibromoaniline polyoxypropylene(2)pentabromophenol, and the like.

The alcohol and polyphosphoric acid are brought together under reaction conditions sufficiently mild that esterification between P—OH and alcoholic hydroxyl groups with concomitant liberation of water is avoided. For example, $P_2O_5$ in dry powder form, or as a slurry in an inert diluent such as toluene, may be added gradually to the alcohol while maintaining the temperature in the range of from 50° to 150° C., and preferably below about 110° C. The reaction is complete when all the $P_2O_5$ is dissolved. When employing a hydrated polyphosphoric acid, the reaction goes so readily that external heat need not be applied. In fact, in the interest of obtaining light-colored products it is highly preferred to control the temperature, by external cooling, or by limiting the rate of introduction of one reactant into the other, to below about 60° C. It is sometimes advantageous, to obtain more rapid mixing and better heat transfer, to carry out the reaction in the presence of an inert diluent, preferably a solvent for the alcohol and/or the resulting acidic partial ester. Preferably, the portion of alcohol to polyphosphoric acid taken is at least sufficient to convert all phosphorous present to the orthophosphate form.

The acidic partial ester is then reacted with a sufficient quantity of an alkylene oxide containing from two to four carbons to at least substantially neutralize the acidity. Suitable alkylene oxides are those containing from two to four carbon atoms. Alkylene oxides which are substituted, for example, the epihalohydrin, may be employed as well as unsubstituted epoxides. Ethylene oxide, propylene oxide, butylene oxide, and epichlorohydrin are exemplary of those which may suitably be employed. The alkylene oxide is added gradually to the agitated reaction mass from the first stage while controlling the temperature, particularly in the early stages, to below 150° C. and preferably below 110° C. The alkylene oxide addition is continued until the acid number levels off at a low value. Unreacted alkylene oxide and diluent, if such has been employed, are stripped from the neutralized product under reduced pressure and moderately elevated temperatures to yield a substantially neutral polyhydroxy phosphate ester.

The polyhydroxy phosphate ester may be reacted with additional polyphosphoric acid, under the reaction conditions described above for reacting the alcohol with polyphosphoric acid, to form an acidic partial ester. The acidic partial ester is then reacted with at least a sufficient quantity of an alkylene oxide to substantially neutralize the acidity. The resulting polyhydroxy phosphate ester may be sequentially reacted with additional polyphosphoric acid and alkylene oxide, provided that alkylene oxide is used in the final reaction.

The following examples illustrate the preparation of polyhydroxy phosphate ester products (a).

EXAMPLE A 168.7 grams of polyoxypropylene(2)pentachlorophenol, 101.6 grams of toluene, and 57.5 grams of polyphosphoric acid (83.8 percent $P_2O_5$) are charged to an autoclave and heated to 105° C. One hundred thirty-six grams of propylene oxide are slowly added to the reaction mass. The temperature is maintained at 102° C. for 1 hour and then cooled to 40° C., 116.3 grams of polyphosphoric acid are added to the cooled mixture, and the mixture is heated to 105° C. Three hundred sixteen grams of propylene oxide are added, and the mixture is heated at 100°–106° C. for 90 minutes. The product is vacuum stripped to constant weight at 100° C. and 1 mm. pressure and filtered through a Buchner-type funnel with a Pyrex C fritted glass disc. The resulting product has an acid number of 8.8 and a hydroxyl number of 238 and contains 8.95 percent phosphorus and 12.8 percent chlorine.

EXAMPLE B

Three hundred grams of toluene and 421.2 grams of polyoxypropylene(2) pentachlorophenol are added to a 2-liter, 3-necked flask and heated to 100° C. While maintaining the temperature at 100° C., 94.3 grams of polyphosphoric acid are slowly added to the reaction flask over a period of 1 hour. The contents of the flask are heated at 100° C. for an additional hour and then vacuum stripped of about 168 grams of toluene. 550.5 grams of this product are then charged to an autoclave and heated to 100° C. Propylene oxide is then slowly added, the rate of addition being such that the temperature does not exceed 106° C. In a period of 50 minutes, 265 grams of propylene oxide are added. The resulting product is vacuum stripped at 100° C. and 1 mm. pressure and filtered. It is a very dark brown liquid having an acid number of 9.5 and a hydroxyl number of 197 and containing 5 percent phosphorus and 32.3 percent chlorine.

EXAMPLE C 305.6 grams of polyoxypropylene(2)pentachlorophenol 97.1 grams of polyphosphoric acid, and 178.2 grams of toluene are charged to an autoclave and heated at 105° C. for 2 hours. Two hundred sixty grams of propylene oxide are slowly added over a 75-minute period. The reaction is continued at 105° C. for an additional 25 minutes. The resulting product, after vacuum stripping to constant weight at 100° C. and 1 mm. pressure and filtering, is a dark brown liquid having an acid number of 2.0 and a hydroxyl number of 204 and containing 6 percent phosphorus and 26.4 percent chlorine.

EXAMPLE D

Following the general procedure described in example C, 169.9 grams of polyoxypropylene(2)pentachlorophenol, 57.1 grams of polyphosphoric acid, and 134.5 grams of propylene oxide are reacted in the presence of 102.2 grams of toluene.

EXAMPLE E 116.3 grams of polyphosphoric acid are added to the product of example D, and the resulting mixture is heated to 105° C. Three hundred eleven grams of propylene oxide are slowly added to the autoclave over a period of 70 minutes. The heat is turned off and the product is allowed to react down while cooling to room temperature. The final product, after filtering and vacuum stripping, is a very dark liquid having an acid number of 1.3 and a hydroxyl number of 241.5 and containing 8.9 percent phosphorus and 12.4 percent chlorine.

EXAMPLE F 319.2 grams of polyoxypropylene(2)dichloroaniline are charged to a reaction flask, and the flask is flushed with nitrogen. The flask is then heated to 60° C.; and 92.2 grams of polyphosphoric acid (83.8 percent $P_2O_5$) which has been heated to 50° C. is slowly added to the flask, the temperature rising to about 100° C. The resulting product is an acidic partial ester of phosphoric acid and the polyoxypropylene(2)di chloroaniline. 251.0 grams of this partial ester are charged to an autoclave and heated to 110° C. 182.2 grams of propylene oxide is then slowly added to the autoclave over a period of 3 hours, the temperature rising to a maximum of 110° C. The resulting product, after vacuum stripping and filtering, is a dark, golden-brown liquid having an acid number of 0.5 and a hydroxyl number of 305 and containing 2.4 percent nitrogen, 5.1 percent phosphorus, and 12.0 percent chlorine.

EXAMPLE G

Two hundred grams of polyoxypropylene(2)di chloroaniline, 300 grams of toluene, and 114.1 grams of polyphosphoric acid are added to a 2-liter, three-necked, reaction flask, and the contents of the flask are heated to 100° C. The polyphosphoric acid is added slowly over a period of 1 hour. After the addition of the polyphosphoric acid, the reaction temperature is maintained for an additional 30 minutes and then cooled to room temperature. 288.2 grams of the resulting product are charged to an autoclave and heated to 110° C. Two hundred eighty-two grams of propylene oxide are slowly added to the autoclave over a period of 1 hour, and the contents of the autoclave are allowed to react down to atmospheric pressure. The product, after vacuum stripping and filtering, is a dark, slightly cloudy, brown liquid having an acid number of 11 and a hydroxyl number of 276 and containing 1.7 percent nitrogen and 8.0 percent phosphorus and 8.8 percent chlorine.

The phosphorus-containing product (b) may be prepared by reacting an alkylene oxide with a mixture of phosphoric acid and an alcohol characterized by the formula

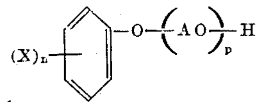

or by the formula

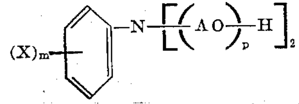

wherein *X* represents a halogen atom, *n* is an integer from 1 to 5, *m* is an integer from 1 to 5, *A* represents an alkylene group containing from two to four carbon atoms, and *p* is from 1 to 5. The reaction is carried out under etherification conditions well known in the art. The particular reaction conditions employed may vary widely and are not critical. Generally, the reaction is carried out by contacting from 1 to 20 mols of alkylene oxide with 1 mol of a mixture containing from 20 to 80 mol percent of phosphoric acid and from 80 to 20 mol percent of the alcohol, at a temperature from 75° to 200° C. Illustrative examples of alkylene oxides include ethylene oxide, propylene oxide, and butylene oxide.

The following are illustrative examples of the preparation of phosphorus-containing product (b).

EXAMPLE H

Three hundred fifty-one grams of polyoxypropylene(2)di chloroaniline and 98.3 grams of 85 percent $H_3PO_4$ are charged to an autoclave and heated to 100° C. and vacuum stripped for 15 minutes. Forty-eight grams of propylene oxide are slowly added to the autoclave over a period of 30 minutes, the temperature rising to a maximum of 100° C. The heat is then removed, and the contents of the autoclave are reacted until the propylene oxide pressure is zero. The reaction mixture is then heated to 102° C., and 205 grams of propylene oxide are slowly added over a period of 45 minutes while maintaining the temperature at 102° C. The reaction is then continued until the propylene oxide pressure has decreased to zero. The product, after vacuum stripping at 100° C. and 1 mm. pressure and filtering, is a golden brown, slightly viscous liquid having an acid number of 2.4 and a hydroxyl number of 368 and containing 4.2 percent phosphorus and 13.3 percent chlorine.

EXAMPLE J

Three hundred forty grams of polyoxypropylene(2)pe ntachlorophenol, 115 grams of 85 percent $H_3PO_4$, and 232 grams of propylene oxide are reacted according to the procedure of Example H.

The polyhydroxy phosphate ester product (d) defined above are known in the prior art as shown by U.S. Pat. No. 3,309,427, the disclosure of which is hereby incorporated hereinto by reference. The polyhydroxy phosphate ester product (d) may be prepared by reacting a polyhydroxy alcohol with polyphosphoric acid in conventional manner to provide an acidic partial ester and then neutralizing the residual acidity by reaction with an alkylene oxide. Preferably, the proportion of polyhydric alcohol to polyphosphoric acid taken is at least sufficient together with any water of composition in the phosphoric acid component, to convert all phosphorus present to the orthophosphate form. It is further preferred that the proportion of polyhydric alcohol reacted with the polyphosphoric acid be sufficiently small to insure that the average functionality of the resulting acidic partial ester composition is greater than 3.1. When the reacting polyhydric alcohol is dihydric this preferred condition is met by keeping the ratio (on a molar basis) of the sum of the alkylene glycol and water of hydration in the polyphosphoric acid to $P_2O_5$ at a value no greater than 2.75. When the reacting polyhydric alcohol is trihydric or of higher functionality the proportion may be higher without objectionally decreasing the functionality but the introduction of more than enough of such polyol than required to bring the ratio of the sum of polyol and water of hydration to $P_2O_5$ to a value greater than 3 is not preferred. The polyhydric alcohol and polyphosphoric acid are brought together under reaction conditions sufficiently mild that esterification between P—OH and alcoholic hydroxyl groups with concomitant liberation of water is avoided. For example, $P_2O_5$ in dry powder form, or as a slurry in an inert diluent such as toluene, may be added gradually to the polyhydric alcohol while maintaining the temperature in the range of from 50° to 150° C., and preferably below about 100° C. The reaction is complete when all the $P_2O_5$ is dissolved. When employing a hydrated polyphosphoric acid, the reaction with polyhydric alcohol goes so readily that external heat need not be applied. In fact, in the interest of obtaining light colored products it is highly preferred to control the temperature, by external cooling, or by limiting the rate of introduction of one reactant into the other, to below about 60° C. It is advantageous, to obtain more rapid mixing and better heat transfer, to carry out the reaction in the presence of an inert diluent, preferably a solvent for the polyhydric alcohol and/or the resulting acidic partial ester.

The resulting acidic partial ester is then reacted with at least a sufficient quantity of an alkylene oxide to substantially neutralize the acidity. The preferred amount of alkylene oxide used in the oxyalkylation is from 8 to 12 mols of alkylene oxide per mol of acidic partial phosphoric ester. Illustrative examples of alkylene oxides which may be used include propylene oxide, ethylene oxide, and butylene oxide. The alkylene oxide is added gradually to the agitated reaction mass from the first stage while controlling the temperature, particularly in the early stages, to below 100° C. and preferably below 50° C. Unreacted alkylene oxide and diluent, if such has been employed, are stripped, from the neutralized product under reduced pressure and moderately elevated temperatures to yield a substantially neutral polyhydroxy phosphate ester.

The polyhydroxy phosphate ester may be reacted with additional polyphosphoric acid, under the reaction conditions described above for reacting the polyhydric alcohol with polyphosphoric acid, to form an acidic partial ester. The acidic partial ester is then reacted with at least a sufficient quantity of an alkylene oxide to substantially neutralize the acidity. The resulting polyhydroxy phosphate ester may be sequentially reacted with additional polyphosphoric acid and alkylene oxide, provided that alkylene oxide is used in the final reaction.

Polyhydric alcohols, preferred for use in the first stage of preparation indicated above, are liquid polyhydric alcohols selected from the group consisting of base polyols having from two to nine hydroxyl groups per mol and hydroxyl numbers ranging from 1,250 to 1,860 and their adducts with up to twice their own weight of two to four carbon alkylene oxides. An illustrative list of polyhydric alcohols so-defined includes ethylene, diethylene and triethylene glycols; propylene and dipropylene glycols, butylene glycol; glycerol; methyl glycerol, ethylene oxide adducts of glycerol containing up to four oxyethylene groups per mol; propylene oxide adducts of glycerol containing up to four oxypropylene groups per mol; propylene oxide adducts of sorbitol or of mannitol containing up to six oxypropylene groups per mol; propylene oxide adducts of sucrose containing up to 10 oxypropylene groups per mol; epichlorohydrin adducts of sorbitol containing up to four hydroxy-chloropropyl groups per mol; and the like.

The following are illustrative examples of the preparation of polyhydroxy phosphate ester products (d).

EXAMPLE K

One thousand three hundred pounds of propylene glycol and 2,915 pounds of dioxane are charged to an autoclave and heated to about 24° C. 2,915 pounds of polyphosphoric acid, preheated to about 82° C., are slowly added to the autoclave. The temperature in the autoclave is allowed to rise to 60°–63° C. After adding the polyphosphoric acid to the autoclave, the reaction is continued for 30 minutes at 60°–63° C. Six thousand pounds of propylene oxide are then added at a rate which allows the temperature to be controlled at 60°–63° C. and the pressure at 20–30 p.s.i.g. The temperature is then raised to 93°–99° C. Two thousand one hundred seventy pounds of propylene oxide are then added while controlling the temperature at 96°–102° C. The reaction is then continued until the acid number is less than 0.8. The reaction product is then cooled and vacuum stripped to remove dioxane and unreacted propylene oxide.

EXAMPLE L

Five hundred thirteen grams (3.0 mols) of polyphosphoric acid (83 percent $P_2O_5$) is reacted with 228 grams (3.0 mols) of propylene glycol in the presence of 400 ml. dioxane as described in example B. The resulting acid partial ester is then reacted with 1,500 grams (16.2 mols) of epichlorohydrin slowly added over a period of 5 hours while maintaining a temperature of 35°–40° C. The neutralization is completed by adding 800 grams (14.3 mols) propylene oxide over a period of 3 hours, while maintaining a temperature of 35°–40° C. The dioxane and excess propylene oxide are then stripped off using final conditions of <0.1 mm. vacuum at 80° C. The resulting product (2,832 grams) is a moderately viscous, clear liquid having an acid number of 3.7 and a hydroxyl number of 318 and containing 20.6 percent chlorine and 6.9 percent phosphorus.

EXAMPLE M

One hundred seventy-one grams of polyphosphoric acid (83 percent $P_2O_5$) were reacted with 290 grams (0.7 mol) of a polyoxypropylene ether of sorbitol containing approximately four oxypropylene groups per mol in the presence of 200 cc. dioxane. Six hundred five grams (10.4 mols) propylene oxide were slowly added over a period of 10 hours to yield an essentially neutral ester.

The dioxane and excess propylene oxide were then stripped off using final conditions of <0.1 mm. vac. at 80° C. The yield was 909 grams of a light colored moderately viscous liquid which analyzed AN=1.5, OH=372 and percent P=7.9.

EXAMPLE N

Five hundred fifty-two grams (6.0 mols) of anhydrous glycerol were charged to a 3-L three-necked flask equipped with stirrer, thermometer, $CO_2$ inlet, dropping funnel and water cooled condenser. A $CO_2$ blanket was started at a rate of 100 cc./minute. Heat was applied and the temperature raised to 105°–110° C. Four hundred twenty-five grams (3 mols) phosphorus pentoxide slurried in 850 grams toluol were then slowly added over a period of 1 hour. The mass was held at 100°–105° C. for 30 minutes and then cooled to 80° C. The acidic partial ester was neutralized by the slow addition of 1,614 grams (28.8 mols) of propylene oxide. The toluol and excess propylene oxide were then stripped off using final conditions of <0.1 mm. vacuum at 108° C. The resulting product was a clear, moderately viscous liquid which analyzed AN=1.6, OH=402 and percent P=7.8. A yield of 2,397 was obtained.

EXAMPLE O

Five hundred thirty-two grams (2.0 mols) of a glycerol-propylene oxide adduct containing three oxypropylene groups per mol were reacted in the presence of 200 cc. dioxane with 142 grams (1.0 mol) phosphorus pentoxide, the latter being added in 25-gram increments over a period of 1 hour, the temperature being maintained at 90°–95° C. during the reaction period. The temperature was then lowered to 25° C. A total of 464 grams (8.3 mols) propylene oxide were then reacted over a period of 10 hours at which point an essentially neutral ester was obtained. The dioxane and excess propylene oxide were then stripped off using final conditions of <0.1 mm. vacuum at 75° C. The resulting product was a clear moderately viscous liquid which analyzed AN=1.0, OH=321 and percent P=6. A yield of 1,026 grams was obtained.

A wide variety of organic polyisocyanates (1) may be used to prepare the polyurethane reaction products, including aromatic, aliphatic, and cycloaliphatic polyisocyanates. Illustrative examples of polyisocyanates include tolylene diisocyanate, 4,4'-methylene-biscyclohexylisocyanate (NACCONATE-H12), diphenyl diisocyanate, triphenyl diisocyanate, 1,3-phenylene diisocyanate, methylene bis(4-phenyl isocyanate), 4-chloro-1,3-phenylene diisocyanate, 1,5-naphthalene diisocyanate, 1,6-hexamethylene diisocyanate, 1,10-decamethylene diisocyanate, isophorone diisocyanate, 1,5-tetrahydronaphthalene diisocyanate, ethylene diisocyanate, polymethylene polyphenyl polyisocyanate (PAPI), and 4,4',4''-triphenyl methane triisocyanate. Arylene diisocyanate, that is those diisocyanates in which each of the two isocyanates is attached directly to an aromatic ring, are preferred.

The relative amounts of halogen-containing polyol (2), phosphorus-containing product (3), and organic polyisocyanate (1) which are used to prepare the polyurethane reaction products of this invention may vary over a wide range. In general, satisfactory results may be obtained when the reactants are used in an amount such that the ratio of isocyanate groups to hydroxyl groups is from 0.5 to 3. While maintaining this ratio, the polyisocyanate (1) may represent from 30 to 75 weight percent of the reactants and the mixture of halogen-containing polyol (2) and phosphorus-containing product (3) may represent from 70 to 25 weight percent of the reactants. The halogen-containing polyol (2) may comprise from 50 to 90 weight percent, and preferably from 65 to 75 weight percent, based on the total weight of (2) and (3) and the phosphorus-containing product (3) may comprise from 50 to 10 weight percent, and preferably from 25 to 35 weight percent, based on the total weight of (2) and (3).

The particular ratio of isocyanate groups to hydroxyl groups used depends upon the type of coating composition desired. If an isocyanate-terminated polyurethane is desired, the ratio used is greater than 1 and preferably from about 1.5 to 2.5. The isocyanate-terminated polyurethane may be cured by the moisture in the atmosphere or by the addition of a polyhydric alcohol to the coating composition prior to application to a substrate. If the ratio used is less than 1, a hydroxyl-terminated polyurethane is formed. These coating compositions require the addition of an isocyanate, an isocyanate-terminated prepolymer, or a blocked isocyanate prior to application of the coating composition. The reactants may also be used in an amount such that the ratio of isocyanate groups to hydroxyl groups is about 1. In such cases, the reactants are mixed together and applied to a substrate before gellation occurs.

The polyurethane reaction products specified above may be prepared by reacting an organic polyisocyanate with both a halogen-containing phenol (2) of the above-defined type and a phosphorus-containing product (3) of the above-defined type. The reaction may be carried out according to the so-called one-shot method or the prepolymer method. However, regardless of the particular method selected for the preparation of the polyurethanes, it is essential that both the halogen-containing polyol (2) and the phosphorus-containing product (3) are used.

The one-shot method comprises reacting the organic polyisocyanate with a mixture of halogen-containing polyol (2) and phosphorus-containing product (3). By this method, all the polyisocyanate, halogen-containing polyol (2), and phosphorus-containing product (3) are reacted in a single step.

Broadly, the prepolymer method comprises sequentially reacting the organic polyisocyanate, halogen-containing polyol (2), and phosphorus-containing product (3). Thus, the polyurethane reaction product may be prepared sequentially by first preparing an isocyanate-terminated prepolymer by reacting at least one compound selected from the group consisting of halogen-containing polyol (2) and phosphorus-containing product (3) with a stoichiometric excess of at least one organic polyisocyanate, and then in a second step reacting the prepolymer with at least one compound selected from the group consisting of halogen-containing polyol (2) and phosphorus-containing product (3), provided, of course, that at least one of the compounds employed is a halogen-containing polyol (2) and that at least one of the compounds employed is a phosphorus-containing product (3). The polyurethane reaction product may also be prepared by first preparing a hydroxyl-terminated prepolymer by reacting an organic polyisocyanate with a stoichiometric excess of a mixture of halogen-containing polyol (2) and phosphorus-containing product (3), and then in a second step reacting the prepolymer with an additional organic polyisocyanate. The polyurethanes may also be prepared by first reacting an organic polyisocyanate with halogen-containing polyol (2) or phosphorus-containing product (3) to form either a hydroxyl-terminated prepolymer or an isocyanate-terminated prepolymer, depending upon the amount of organic polyisocyanate employed, and then in a second step reacting the prepolymer with additional organic polyisocyanate, halogen-containing polyol (2), and/or phosphorus-containing product (3).

The above-described methods of preparing the polyurethane reaction product may be carried out at any convenient temperature, preferably above 25° C. to hasten the reaction but not above 150° C. where undesirable side reactions occur, in a substantially anhydrous environment for the length of time required to react substantially all of the available hydroxyl groups of the halogen-containing polyol (2) and the phosphorus-containing product (3) with the isocyanate groups of the organic polyisocyanate. At the especially convenient temperatures of 70° to 90° C., the reaction usually requires from 1 to 8 hours. The reaction may be carried out in the presence of an inert organic solvent.

The solvents employed in the coating compositions must be nonreactive to isocyanate and hence must not have active hydrogen in their structure. The solvents should be sufficiently low boiling that they will vaporize from the compositions when coated onto a substrate in a thin film. Hydrocarbon solvents and oxygen-containing solvents such as ketones, ethers, and esters are suitable. Illustrative examples of specific solvents which may be employed in the coating compositions of this invention include: toluene, xylene, hexyl acetate, ethylene glycol monoethylether acetate, butyl acetate, ethylene glycol monobutylether acetate, methyl ethyl ketone, acetone, dipropylether, dimethyl formamide, tetrahydrofuran, ethyl acetate, methyl acetate, and others. Aliphatic hydrocarbons may be used as diluents to extend the coating composition to the desired concentration of solids.

The proportion of solvent may be varied over a rather wide range; however, about 20 percent by weight of solvent is a reasonable minimum considering that below this amount of solvent the solution becomes so viscous that stirring is quite difficult. Correspondingly, the formation of good, homogeneous films is also difficult at low concentrations of solvents. A practical upper limit of solvents is about 70 percent by weight. Above 70 percent, an unnecessary quantity of solvent is used and the films formed are quite thin. It is to be understood, however, that lower and higher concentrations of solvent may be used if desired.

The amount of polyurethane reaction product present in the coating compositions may vary over a wide range. In general, the amount of polyurethane may vary from 30 to 80 percent by weight based on the total weight of coating compositions. The coatings formed are quite thin at lower concentrations. At higher concentrations, the solutions are quite viscous and difficult to apply to the substrate and the formation of homogeneous films is difficult. However, lower and higher concentrations of the polyurethane reaction product may be used if desired.

The flame retardancy of the above-described coating compositions may be increased, without sacrifice of other desirable properties such as resiliency and clarity, by incorporating into the coating composition a compound characterized by the formula

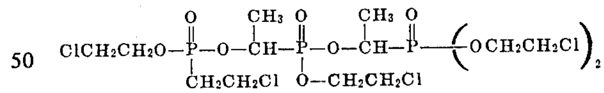

The amount of said compound employed in the coating composition may vary from 5 to 25 percent by weight, and preferably from 5 to 15 percent by weight, based on the total weight of the coating composition. The said compound may be obtained from the Monsanto Chemical Company under the name Phosgard C—22–R. The coating compositions may also contain minor amounts of other additives that are conventionally used, such as haloalkyl phosphates and alkylene diamine tetraacetic acid.

The coating compositions of this invention may be applied to various substrates by any of the conventional fluid coating techniques, for example: spray, dip, brush, knife, and roller coating. The films or coatings formed from the coating compositions of this invention are characterized by excellent flame retardancy, excellent resiliency, high tensile strength, high abrasion resistance, and good adhesion to many surfaces, such as wood, metal, glass, cellulosic and synthetic fabrics, leather, ceramics, etc. The compositions are particularly useful as wood varnishes on floors, furniture, bowling alleys and bowling pins.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight, unless otherwise stated.

EXAMPLE 1

20.3 parts of polyoxypropylene(2.4) 2,2-bis(4-hydroxy-dibromophenyl) propane, 13.6 parts of the product of example H, 20.0 parts of xylene, and 20.0 parts of cellosolve acetate are added to a 1-liter, round-bottom flask equipped with mechanical stirrer, temperature indicator, inert gas inlet, and condenser. The mixture is stirred at room temperature until a clear, homogeneous solution is obtained. The polyol solution is then heated to 80° C. and 26.1 parts of toluene diisocyanate are added over a 45-minute period. The reactants are maintained at 80° C. for 5 hours under a blanket of nitrogen and then cooled at room temperature. The reaction mixture is diluted with equal parts of xylene and cellosolve acetate to 57 percent solid content and 0.6 part of a silicone flow control agent (Dow Corning Surfactant DC–11) is added. The coating composition is then painted onto poplar panels according to the method of ASTM test D–1360–58. After a 2-week conditioning period at 25° C. and 50 percent relative humidity the fire resistance of the panels is determined by the ASTM cabinet test method (ASTM test D–1360–58). The burned panels have an average weight loss of 12.21 grams and a char volume of 8.88 cubic inches.

EXAMPLE 2

Example 1 is repeated except that 10 parts of Phosgard C–22–R are added to each 100 parts of the coating composition prior to painting onto the poplar panels. The burned panels have a weight loss of 11.39 grams and a char volume of 8.86 cubic inches.

EXAMPLE 3

25.8 parts of polyoxypropylene(2.4) 2,2-bis(4-hydroxy-dibromophenyl) propane, 11.1 parts of the product of example G, 20.0 parts of xylene and 20.0 parts of cellosolve acetate are charged to the reaction flask described in example 1; and the mixture is stirred at room temperature until a clear, homogeneous solution is obtained. The polyol solution is then heated to 80° C. and 23.1 parts of toluene diisocyanate are added over a 45-minute period. The reactants are maintained at 80° C. for 5 hours under a blanket of nitrogen. The reaction mixture is then cooled at room temperature and 0.6 part of a silicone surface active agent is added. The resulting varnish is diluted to 57 percent solids content with equal parts of xylene and cellosolve acetate. The varnish is then painted onto poplar panels and tested according to the method described in example 1. The burned panels have a weight loss of 12.15 grams and a char volume of 10.17 cubic inches.

EXAMPLE 4

Example 3 is repeated except that 10 parts by weight of Phosgard are added to the varnish composition. The burned panels have a weight loss of 14.22 grams and a char volume of 9.8 cubic inches.

EXAMPLE 5

11.0 parts of the product of example F, 25.7 parts of polyoxypropylene(2.4) 2,2-bis(4-hydroxy-dibromophenyl) propane, 20.0 parts of xylene, and 20.0 parts of cellosolve acetate are charged to the reaction flask described in example 1; and the mixture stirred at room temperature until a clear homogeneous solution is obtained. The polyol solution is then heated to about 80° C. and 23.3 parts of toluene diisocyanate are added over a 45 minute period. The reactants are maintained at about 80° C. for approximately 5 hours under a blanket of nitrogen. The reaction mixture is then cooled to room temperature and diluted to 57 percent solid content with equal parts of xylene and cellosolve acetate. The resulting varnish is then coated onto poplar panels and tested according to the procedure set forth in example 1. The burned panels have an average weight loss of 16.66 grams and an average char volume of 10.81 cubic inches.

EXAMPLE 6

Example 5 is repeated except that 10 percent by weight of Phosgard is added to the varnish. The burned panels have a weight loss of 15.19 grams and a char volume of 10.11 cubic inches.

EXAMPLE 7

14.9 parts of the reaction product of example E, 22.2 parts of polyoxypropylene(2.4) 2,2-bis(4-hydroxy-dibromophenyl) propane, 20.0 parts of xylene and 20.0 parts of cellosolve acetate are charged to the reaction flask described in example 1; and the mixture is stirred at room temperature until a clear homogeneous solution is obtained. The polyol solution is then heated to 80° C. and 22.9 parts of toluene diisocyanate are added over a 45-minute period. The reactants are maintained at 80° C. for 5 hours under a blanket of nitrogen. The reaction mixture is cooled to room temperature and 0.6 part of a silicone surface active agent is added. The resulting varnish is then coated onto poplar panels and tested according to the method set forth in example 1. The burned panels have an average weight loss of 13.62 grams and an average char volume of 7.27 cubic inches.

EXAMPLE 8

Example 7 is repeated except that 10 percent by weight of Phosgard is added to the varnish. The burned panels have an average weight loss of 12.00 grams and an average char volume of 7.4 cubic inches.

EXAMPLE 9

23.0 parts of polyoxypropylene(2.4) 2,2-bis(4-hydroxy-dibromophenyl) propane, 15.3 parts of the reaction product of example C, 20.0 parts of xylene and 20.0 parts of cellosolve acetate are added to the reaction flask described in example 1; and the mixture is stirred at room temperature until a clear homogeneous solution is obtained. The polyol solution is then heated to 80° C. and 21.7 parts of toluene diisocyanate are added over a 45-minute period. The reactants are maintained at 80° C. for about 5 hours under a blanket of nitrogen. The reaction mixture is then cooled to room temperature and 0.6 part of a surface active agent is added. The solution is then diluted with equal parts of the solvent blend to 57 percent solids content and tested according to the procedure of example 1. The burned panels show an average weight loss of 13.60 grams and an average char volume of 7.19 cubic inches.

EXAMPLE 10

Example 9 is repeated except that 10 percent by weight of Phosgard is added to the varnish. The burned panels have a weight loss of 13.11 grams and a char volume of 7.45 cubic inches.

EXAMPLE 11

Following the procedure of example 2, a solution is prepared by dissolving 15.5 parts of the reaction product of example B and 23.2 parts of polyoxypropylene(2.4) 2,2-bis(4-hydroxy-dibromophenyl) propane, and 40 parts of a blend of xylene and cellosolve acetate. 21.3 parts of hexamethylene-diisocyanate are added to the polyol solution over a 30-minute period. The reaction mixture is then heated at 80° C. for 5 hours and then cooled to room temperature. The reaction product is then diluted with equal parts of xylene and cellosolve acetate to a solid content of 57 percent. A poplar panel coated with the varnish and tested according to ASTM-D-1360-58, shows a weight loss of 12.29 grams and a char volume of 7.84 cubic inches.

EXAMPLE 12

Example 11 is repeated except that 10 percent by weight of Phosgard is added to the varnish composition. A poplar panel coated with the varnish and tested according to ASTM-D-1 360-58, shows a weight loss of 11.19 grams and a char volume of 7.39 cubic inches.

EXAMPLE 13

A mixture of 26.7 parts of polyoxypropylene(2.4) 2,2-bis(4-hydroxy-dibromophenyl) propane, and 11.5 parts of the reaction product of example A are dissolved in a solvent mixture of 10 grams of toluene and 10 grams of ethylene glycol monoethyl ether acetate. The solution is placed in a 1-liter, round-bottom flask equipped with mechanical stirrer, temperature indicator, inert gas inlet, and condenser. The flask is placed in a heating mantle, heat is applied, and carbon dioxide is bubbled into the solution. The stirring rate is set at 130 revolutions per minute, and the solution is heated to 135° C. Approximately 8 ml. of solvent are removed, and the polyol solution is cooled below distillation temperature. 21.8 parts of hexamethylene diisocyanate are charged to a flask identical to the one described above. The diisocyanate is dissolved in a solvent mixture consisting of 10 parts of toluene and 10 parts of ethylene glycol monoethyl ether acetate. The polyol solution described above is added to the diisocyanate solution over a 45-minute period at a temperature of 28° to 30° C. Carbon dioxide gas is bubbled into the reaction mixture, and the mixture is heated at 90° C. for 5 hours. The reaction mixture is cooled to room temperature and 0.6 part of a surface active agent is added. The resulting varnish is then coated onto poplar panels and tested according to the method of the ASTM test D-1360-58. The burned panels have an average weight loss of 9.61 grams and an average char volume of 7.37 cubic inches.

EXAMPLE 14

Example 13 is repeated except that 10 parts by weight of Phosgard are added to the varnish composition. The burned panels have an average weight loss of 9.86 grams and an average char volume of 7.26 cubic inches.

EXAMPLE 15

Three hundred forty-eight grams of polyoxyethylene(10)bis(4-hydroxy-dichlorophenyl) sulfone, 131 grams of the reaction product of example D, 130 grams of toluene, and 120 grams of ethylene glycol monoethyl ether acetate are charged to a 2-liter flask, and the mixture is stirred at room temperature until a clear, homogeneous solution is obtained. The polyol solution is then heated to 80° C. and 280 grams of tolylene diisocyanate are added over a 1-hour period. The reactants are maintained at 80° C. for 5 hours. The reaction mixture is then cooled to room temperature. Poplar panels coated with the resulting varnish pass ASTM Test D-1360-58.

EXAMPLE 16

Four hundred twenty-six grams of polyoxybutylene(2) bis(4-hydroxy-tetrabromophenyl) ether, 131 grams of the reaction product A, and 280 grams of tolylene diisocyanate are reacted following the procedure of example 15. The resulting product is a clear, moisture-curing, polyurethane varnish which yields transparent coatings having superior flame-retardancy and resiliency.

EXAMPLE 17

One hundred forty-six grams of polyoxypropylene(4) dichloro-dibromo-4,4'-dihydroxybiphenyl, 66 grams of the reaction product of example J, and 145 grams of tolylene diisocyanate are reacted according to the procedure of example 1 to form a clear, moisture-curing, polyurethane varnish.

EXAMPLE 18

Seventy-three grams of polyoxypropylene(4) dichloro-dibromo-4,4'-dihydroxybiphenyl, 73 grams of polyoxypropylene(2.4) 2,2-bis(4-hydroxy-dibromophenyl) propane, 33 grams of the reaction product of example H, 33 grams of the reaction product of example E, and 150 grams of tolylene diisocyanate are reacted according to the procedure of example 15 to form a polyurethane varnish.

EXAMPLE 19

One hundred ninety-four grams of polyoxypropylene(2.4) 2,2-bis(4-hydroxy-dibromophenyl) propane, 90 grams of the polyhydroxy phosphate ester product of example K, 81 grams of the reaction product of example E, and 267 grams of tolylene diisocyanate are reacted in 184 grams of xylene and 184 grams of ethylene glycol monoethyl ether acetate according to the procedure of example 15 to form a polyurethane varnish.

EXAMPLE 20

One hundred ninety-four grams of polyoxypropylene(2.4) 2,2-bis(4-hydroxy-dibromophenyl) propane, 86 grams of the polyhydroxy phosphate ester product of example K, 81 grams of the reaction product of example G, and 271 grams of tolylene diisocyanate are reacted according to the procedure of example 19 to form a polyurethane varnish.

EXAMPLE 21

Three hundred forty-four grams of a polyisocyanate having the formula

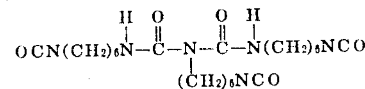

(available from Naftone Inc. under the name Desmodur N-75) are added to a blend of 240 grams of polyoxypropylene(2.4) 2,2-bis(4-hydroxy-dibromophenyl) propane, 102 grams of the reaction product of example G, 114 grams of xylene, and 200 grams of ethylene glycol monoethyl ether acetate. The resulting mixture is a clear varnish which, after application to a substrate, yields transparent coatings having superior flame retardancy and resiliency.

EXAMPLE 22

Three hundred sixty-seven grams of a polyisocyanate characterized by the formula:

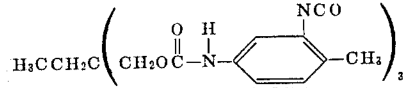

(available from the Mobay Chemical Company under the name Mondur CB-75) are added to a mixture of 195 grams of polyoxypropylene(2.4) 2,2-bis(4-hydroxy-dibromophenyl) propane, 130 grams of the reaction product of example E, 108 grams of xylene, and 200 grams of ethylene glycol monoethyl ether acetate. The resulting mixture is a clear varnish which may be applied to a substrate to form a flame-retardant, polyurethane coating.

EXAMPLE 23

A blend of 115 grams of polyoxypropylene(2.4) 2,2-bis(4-hydroxy-dibromophenyl) propane, 77 grams of the reaction product of example G, 64 grams of xylene and 64 grams of ethylene glycol monoethyl ether acetate is added to 680 grams of the coating composition of example 1. The resulting mixture is a clear varnish which may be applied to a substrate to form a clear, resilient, flame-retardant, polyurethane coating.

EXAMPLE 24

A solution of an isocyanate-terminated polyurethane is prepared as described in example 1. To 876 grams of this solution are added a blend of 74 grams of dipropyleneglycol, 25 grams of xylene, and 25 grams of ethylene glycol monoethyl ether acetate. The resulting product is then applied to poplar panels to form a transparent coating having excellent flame retardancy and resiliency.

Although this invention has been described with reference to specific chemical compounds, including specific halogen-containing polyols, phosphorus-containing products, polyisocyanates, and solvents, as well as specific method steps, it will be appreciated that numerous other chemical compounds may frequently be substituted for those described and that specific method steps may frequently be modified or even eliminated, all within the spirit and scope of this invention as defined in the appended claims.

Having described the invention, what is desired to be secured by Letters Patent is:

1. A composition which is suitable for the preparation of polyurethanes and which comprises from 50 to 90 weight percent of a halogen-containing polyol and from 50 to 10 weight percent of a phosphorus-containing product, wherein said weight percent is based on the total weight of halogen-containing polyol and phosphorus-containing product, wherein said halogen-containing polyol is characterized by the generalized formula

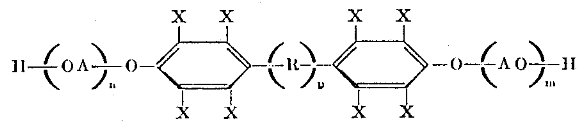

wherein each $X$ represents hydrogen or halogen and at least one $X$ is halogen, $R$ represents an alkylene group containing from one to four carbon atoms, $$-\overset{O}{\underset{O}{\overset{\|}{\underset{\|}{S}}}}-,\ -\overset{O}{\overset{\|}{C}}-,\ -CH_2OCH_2-,\ \text{or}\ -O-,$$

each $A$ represents an alkylene group containing from two to four carbon atoms, $p$ is 0 or 1, $n$ and $m$ are integers, and the sum of $n$ and $m$ is from 2 to 10, and wherein the phosphorus-containing product is selected from the group consisting of a. a polyhydroxy phosphate ester product obtained by first reacting a polyphosphoric acid containing at least 80 percent by weight of phosphoric anhydride with an alcohol characterized by the formula

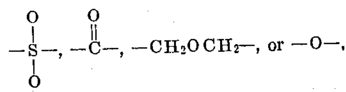

or by the formula

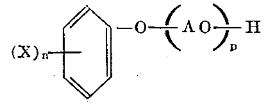

wherein $X$ represents a halogen atom, $n$ is an integer from 1 to 5, $m$ is an integer from 1 to 5, $A$ represents an alkylene group containing from two to four carbon atoms, and $p$ is from 1 to 5, to form an acidic partial ester and then reacting the acidic partial ester with a sufficient amount of an alkylene oxide having from two to four carbon atoms to substantially neutralize the acidity, wherein, in the first stage, the ratio of the sum of the mols of said alcohol and the mols of water of composition in the polyphosphoric acid to mols to $P_2O_5$ in the reaction mixture is at least sufficient to convert all of the phosphorous present to the ortho phosphate form, b. the product obtained by reacting an alkylene oxide with a mixture containing from 20 to 80 mol percent of a phosphoric acid and from 80 to 20 mol percent of an alcohol characterized by the formula

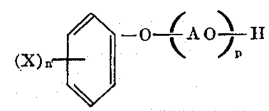

or by the formula

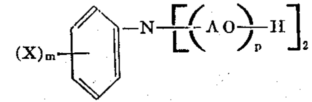

wherein $X$ represents a halogen atom, $n$ is an integer from 1 to 5, $m$ is an integer from 1 to 5, $A$ represents an alkylene group containing from two to four carbon atoms, and $p$ is from 1 to 5, at a temperature from 75° to 200° C., and c. a mixture containing from 90 to 10 percent by weight of at least one product selected from the group consisting of product (a) and product (b) and from 10 to 90 percent by weight of a polyhydroxy phosphate ester product (d) obtained by first reacting a polyphosphoric acid containing at least 80 percent by weight of phosphoric anhydride with a polyhydric alcohol to form an acidic partial ester and then reacting the acidic partial ester with a sufficient amount of ethylene oxide having from two to four carbon atoms to substantially neutralize the acidity, wherein the said polyhydric alcohol is a polyhydric alcohol selected from the group consisting of base polyols having from two to nine hydroxyl groups per mol and hydroxyl numbers of from about 1,250 to about 1,850 and their condensates with up to twice their own weight of two to four carbon alkylene oxides, and wherein, in the first stage, the ratio of the sum of the mols of said polyhydric alcohol and the mols of water of composition in the polyphosphoric acid to mols of $P_2O_5$ in the reaction mixture is no greater than 2.75 when the said polyhydric alcohol is a diol and is no greater than 3 when the said polyhydric alcohol is a functionality greater than 3 but, in any case, is at least sufficient to convert all the phosphorous present to the ortho phosphate form.

2. A composition of claim 1 wherein the weight percent of halogen-containing polyol is from 65 to 75 weight percent and the weight percent of phosphorus-containing product is from 25 to 35 weight percent.

3. A composition of claim 1 wherein the halogen-containing polyol is characterized by the generalized formula:

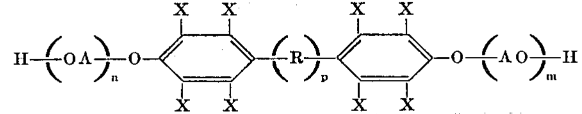

wherein $X$ is bromine or chlorine, $A$ is an ethylene or propylene group, $R$ is an alkylene group containing from two to four carbon atoms, $n$ and $m$ are integers, and the sum of $n$ and $m$ is from 2 to 8.

4. A composition of claim 3 wherein $X$ is bromine, $A$ is propylene, $R$ is $$-\overset{CH_3}{\underset{CH_3}{\overset{|}{\underset{|}{C}}}}-$$

and the sum of $n$ and $m$ is from 2 to 6.

5. A composition of claim 1 wherein the halogen-containing polyol is selected from the group consisting of polyoxypropylene(2.4) 2,2-bis(4-hydroxy-dibromophenyl) propane; polyoxypropylene(2.4) 2,2-bis(2,3,4,6-tetrabromo-4-hydroxyphenyl) propane; polyoxypropylene(2) 2,2-bis(2,3,5,6-tetrabromo-4-hydroxyphenyl) propane; polyoxypropylene(2)

2,2-bis(2,3,5,6-tetraiodo-4-hydroxyphenyl) propane; polyoxyethylene(8) 2,2-bis(2,3-dichloro-4-hydroxyphenyl) propane; polyoxybutylene(2.1) 2,2-bis(2,3-dichloro-5,6-dibromo-4-hydroxylphenyl) propane; polyoxyethylene(2) 2,2-bis(2-chloro-4-hydroxyphenyl) propane; polyoxypropylene(4)bis(4-hydroxy-dibromobenzyl) ether; polyoxypropylene(2.1)bis(4-hydroxy-dibromophenyl) ketone; polyoxypropylene(10) bis(4-hydroxy-dibromophenyl) sulfone; polyoxypropylene(2) bis(4-hydroxy-dibromophenyl) ether; polyoxypropylene(5) 1,1'-dihydroxybiphenyl; polyoxypropylene(2.1) bis(4-hydroxy-dibromophenyl) methylene; and polyoxy-ethylene(2.2) 2,2-bis(4-hydroxy-dibromophenyl) propane.

6. A composition of claim 1 wherein the phosphorus-containing product is a polyhydroxy phosphate ester product obtained by first reacting a polyphosphoric acid containing at least 80 percent by weight of phosphoric anhydride with an alcohol characterized by the formula

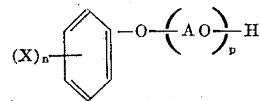

or by the formula

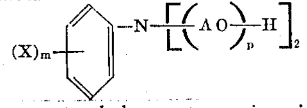

wherein $X$ represents a halogen atom, $n$ is an integer from 1 to 5, $m$ is an integer from 1 to 5, $A$ represents an alkylene group containing from two to four carbon atoms, and $p$ is from 1 to 5, to form an acidic partial ester and then reacting the acidic partial ester with a sufficient amount of an alkylene oxide having from two to four carbon atoms to substantially neutralize the acidity, wherein, in the first stage, the ratio of the sum of the mols of said alcohol and the mols of water of composition in the polyphosphoric acid to mols of $P_2O_5$ in the reaction mixture is at least sufficient to convert all of the phosphorous present to the ortho phosphate form.

7. A composition of claim 1 wherein the phosphorus-containing product is the product obtained by reacting an alkylene oxide with a mixture containing from 20 to 80 mols percent of a phosphoric acid and from 80 to 20 mols percent of an alcohol characterized by the formula

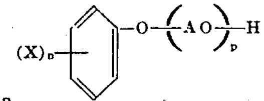

or by the formula

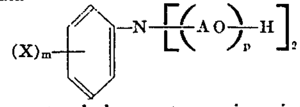

wherein $X$ represents a halogen atom, $n$ is an integer from 1 to 5, $m$ is an integer from 1 to 5, $A$ represents an alkylene group containing from two to four carbon atoms, and $p$ is from 1 to 5, at a temperature from 75° to 200° C.

8. A composition of claim 1 wherein the phosphorus-containing product is a mixture containing from 90 to 10 percent by weight of at least one product selected from the group consisting of product (a) and product (b) and from 10 to 90 percent by weight of a polyhydroxy phosphate ester product (d) obtained by first reacting a polyphosphoric acid containing at least 80 percent by weight of phosphoric anhydride with a polyhydric alcohol to form an acidic partial ester and then reacting the acidic partial ester with a sufficient amount of an alkylene oxide having from two to four carbon atoms to substantially neutralize the acidity, wherein the said polyhydric alcohol is a polyhydric alcohol selected from the group consisting of base polyols having from two to nine hydroxyl groups per mol and hydroxyl numbers of from about 1,250 to about 1,850 and their condensates with up to twice their own weight of two to four carbon alkylene oxides, and wherein, in the first stage, the ratio of the sum of the mols of said polyhydric alcohol and the mols of water of composition in the polyphosphoric acid to mols of $P_2O_5$ in the reaction mixture is no greater than 2.75 when the said polyhydric alcohol is a diol and is no greater than 3 when the said polyhydric alcohol is of functionality greater than 3 but, in any case, is at least sufficient to convert all the phosphorus present to the orthophosphate form.

* * * * *

PO-1050
(5/69)

UNITED STATES PATENT OFFICE
CERTIFICATE OF CORRECTION

Patent No. 3,639,294 Dated February 1, 1972

Inventor(s) Joseph P. Burns, Joseph Feltzin, Erich Kuehn

It is certified that error appears in the above-identified patent and that said Letters Patent are hereby corrected as shown below:

Column 2, line 21, after the word "four" and before the word "atoms" add the word -- carbon --.

Column 9 , line 22, the word "phenol" should read -- polyol --.

Column 11, line 50, Example 3, the word "at" should read -- to --.

Column 16, lines 52-56, Claim 3, the formula is incorrect and should be replaced with the following formula:

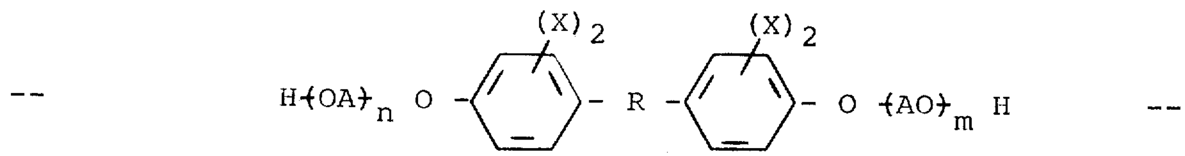

Signed and sealed this 5th day of December 1972.

(SEAL)
Attest:

EDWARD M.FLETCHER,JR.
Attesting Officer

ROBERT GOTTSCHALK
Commissioner of Patents